(12) United States Patent
Tsuboi

(10) Patent No.: US 10,919,150 B2
(45) Date of Patent: Feb. 16, 2021

(54) MOTOR CONTROL SYSTEM, CONTROL METHOD FOR MOTOR CONTROL SYSTEM, AND ROBOT SYSTEM

(71) Applicant: KAWASAKI JUKOGYO KABUSHIKI KAISHA, Kobe (JP)

(72) Inventor: Nobutaka Tsuboi, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/614,410

(22) PCT Filed: May 17, 2018

(86) PCT No.: PCT/JP2018/019195
§ 371 (c)(1),
(2) Date: Nov. 18, 2019

(87) PCT Pub. No.: WO2018/212305
PCT Pub. Date: Nov. 22, 2018

(65) Prior Publication Data
US 2020/0180149 A1    Jun. 11, 2020

(30) Foreign Application Priority Data

May 18, 2017  (JP) ................................. 2017-099192

(51) Int. Cl.
*B25J 9/16* (2006.01)
*B25J 9/12* (2006.01)
(Continued)

(52) U.S. Cl.
CPC ............. *B25J 9/1628* (2013.01); *B25J 9/126* (2013.01); *G05B 19/19* (2013.01); *G05B 19/416* (2013.01); *G05B 2219/50391* (2013.01)

(58) Field of Classification Search
CPC . B25J 9/1628; B25J 9/126; B25J 9/162; B25J 9/1633; G05B 2219/50391;
(Continued)

(56) References Cited

U.S. PATENT DOCUMENTS 10,042,343 B2 * 8/2018 Ohishi .................. G05B 19/04
2009/0015188 A1   1/2009 Sasaki et al.
2011/0238221 A1   9/2011 Kawazu et al.

FOREIGN PATENT DOCUMENTS

JP        2003-223225 A    8/2003
JP        2008-90692 A     4/2008
(Continued)

*Primary Examiner* — Antony M Paul
(74) *Attorney, Agent, or Firm* — Oliff PLC

(57) ABSTRACT

A motor control system including an input shaft connected to an output shaft of the motor and an output shaft connected to a load, the system including: a detection unit for detecting a rotation speed of the output shaft; a speed deviation generation unit generating a speed command position and calculates a speed deviation between the speed command and rotation speed of the output shaft; an angular transmission error compensation unit estimated between a rotation angle of the output shaft and of the speed reducer, and corrects the speed command, speed deviation, or rotation speed of the output shaft detected based on the event detected by the detection unit, based on the estimated angular transmission error; a current command generation unit generates a current command based on the speed deviation; and a current control unit controls a current supplied to the motor based on the current command.

10 Claims, 10 Drawing Sheets

(51) Int. Cl.
*G05B 19/19* (2006.01)
*G05B 19/416* (2006.01)

(58) Field of Classification Search
CPC .. G05B 19/416; G05B 19/231; G05B 19/251;
G05B 19/291; G05B 19/311; G05B
19/351; G05B 19/371; G05B 2219/33218;
G05B 2219/42121; G05B 2219/45083;
G05B 2219/31094; G05B 2219/33337;
G05B 19/404; G05B 19/19; G05B
2219/34027; Y10S 901/08; H02P 1/00;
H02P 1/04; H02P 1/18; H02P 1/24; H02P
1/26; H02P 1/265; H02P 1/42; H02P
1/54; H02P 3/00; H02P 6/00; H02P 6/16;
H02P 6/12; H02P 6/06; H02P 2006/045;
H02P 6/28; H02P 23/00; H02P 27/00;
H02P 27/04; H02P 27/06

USPC ............ 901/25, 28, 30, 31, 32, 38; 318/560,
318/561, 568.2, 12, 13, 15, 8, 568.11,
318/568.12, 568.18, 568.22, 568.21,
318/400.01, 700, 701, 721, 727, 779, 799,
318/801, 430, 432
See application file for complete search history.

(56) References Cited

FOREIGN PATENT DOCUMENTS

| | | |
|---|---|---|
| JP | 2011-204010 A | 10/2011 |
| JP | 2014-136260 A | 7/2014 |
| WO | 2007/099635 A1 | 9/2007 |

* cited by examiner

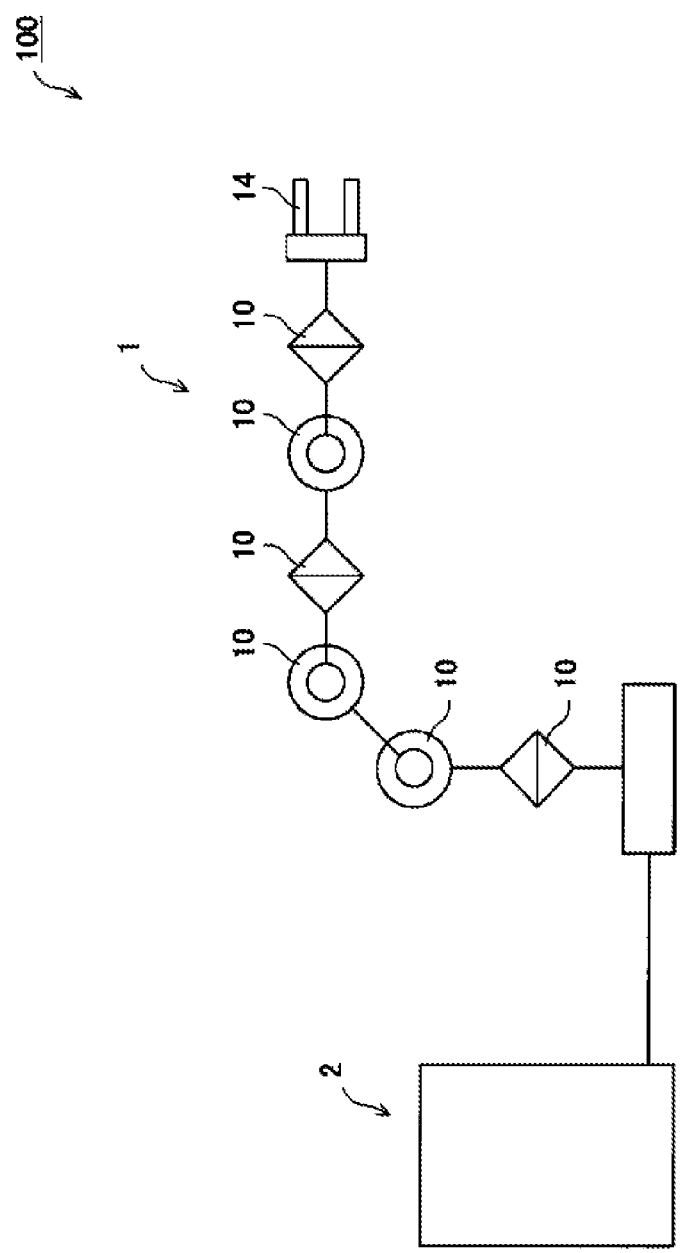
[Fig. 1]

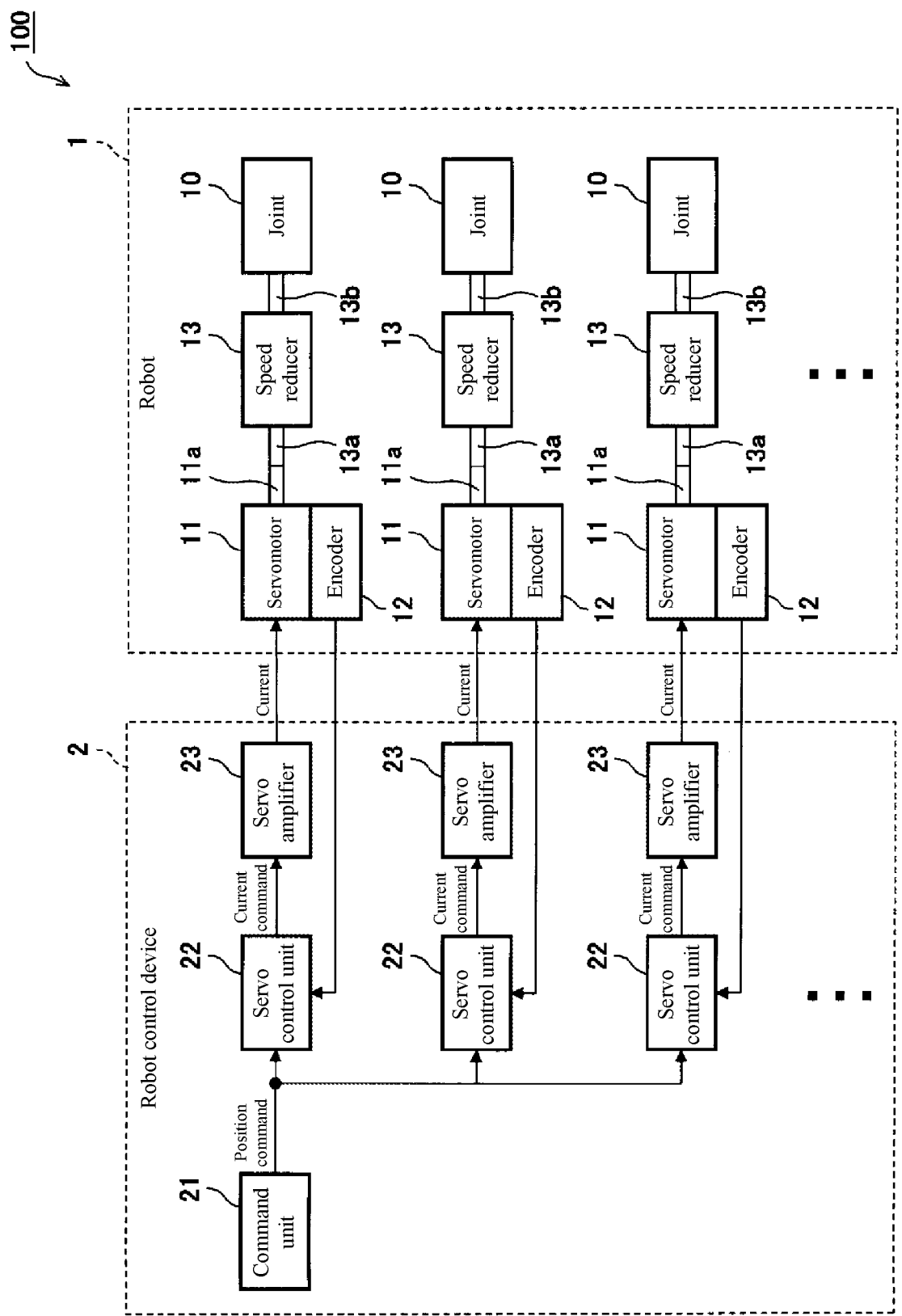
[Fig. 2]

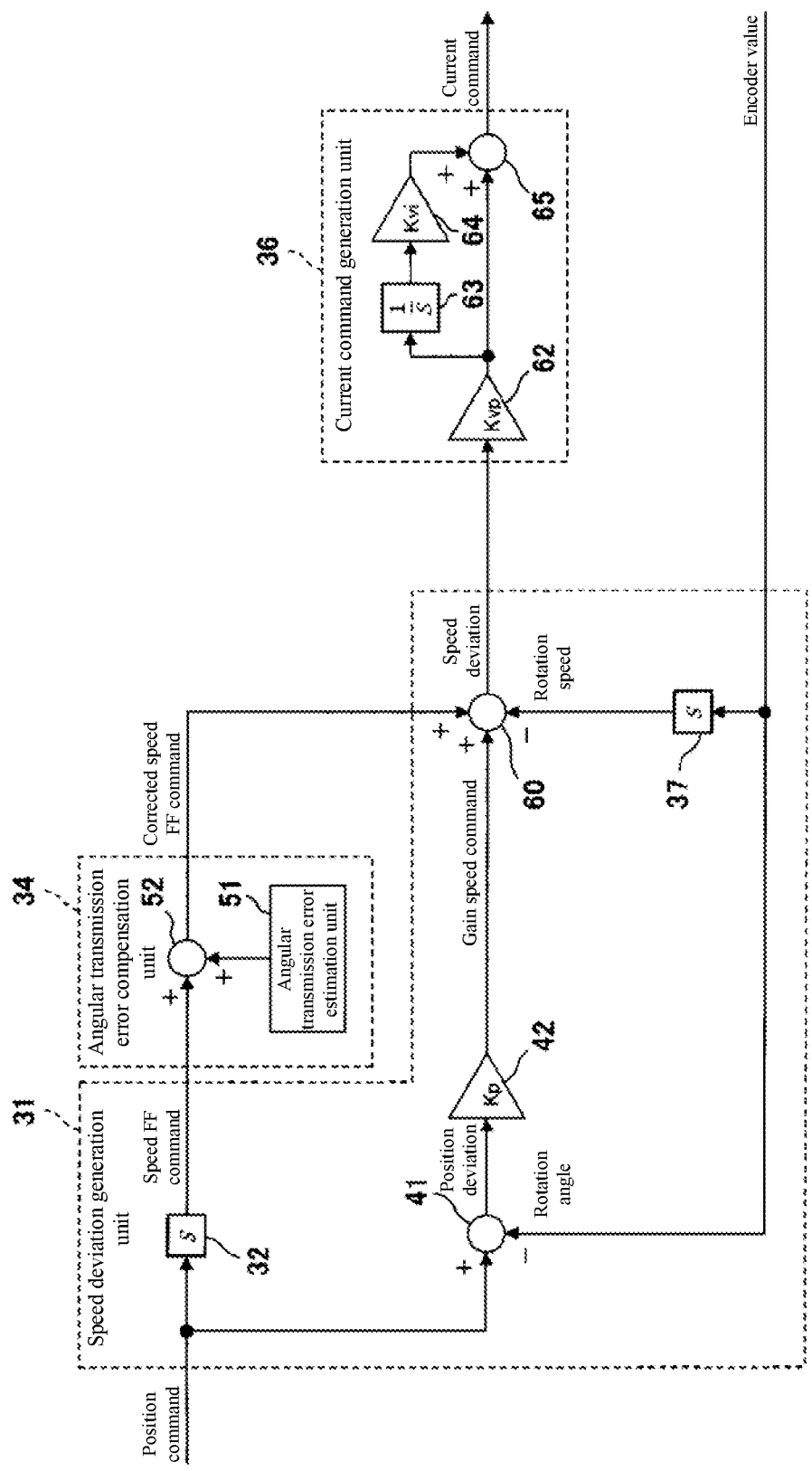
[Fig. 3]

[Fig. 4]
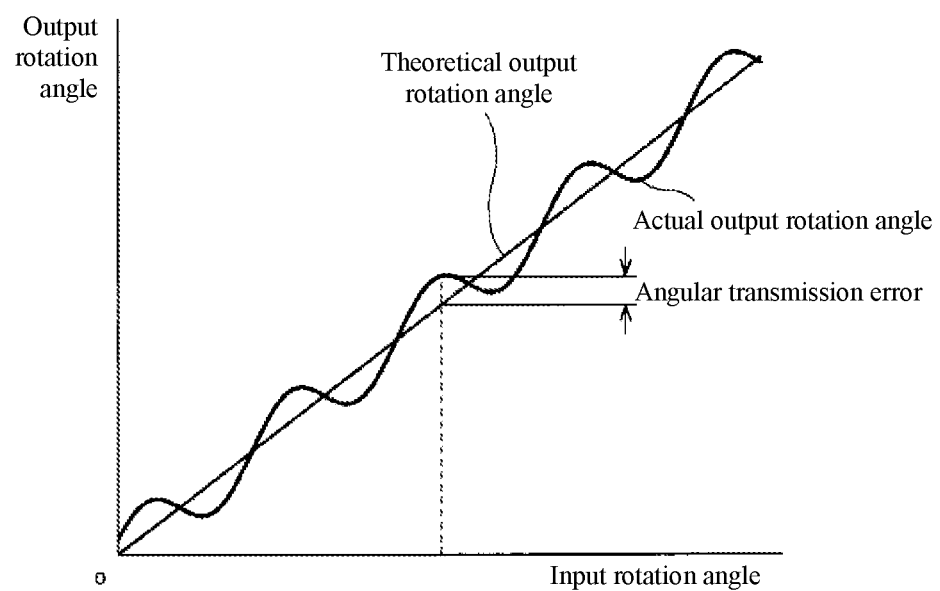

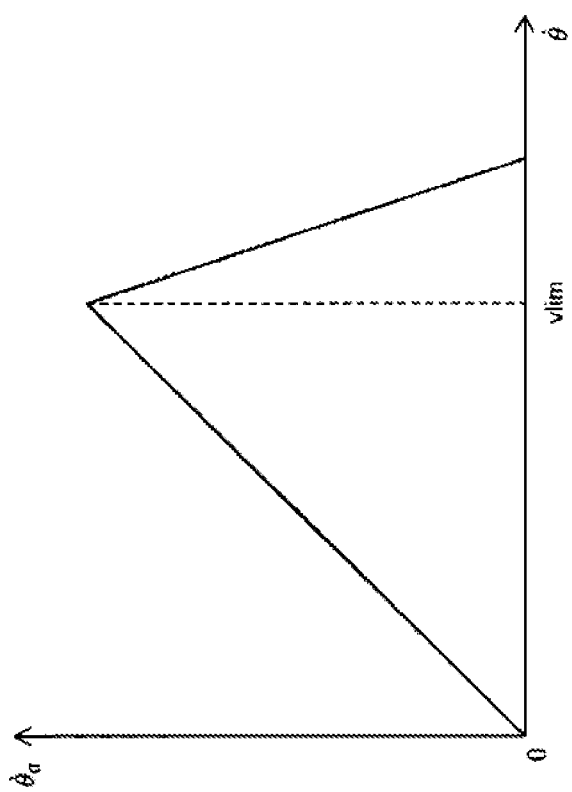
[Fig. 5]

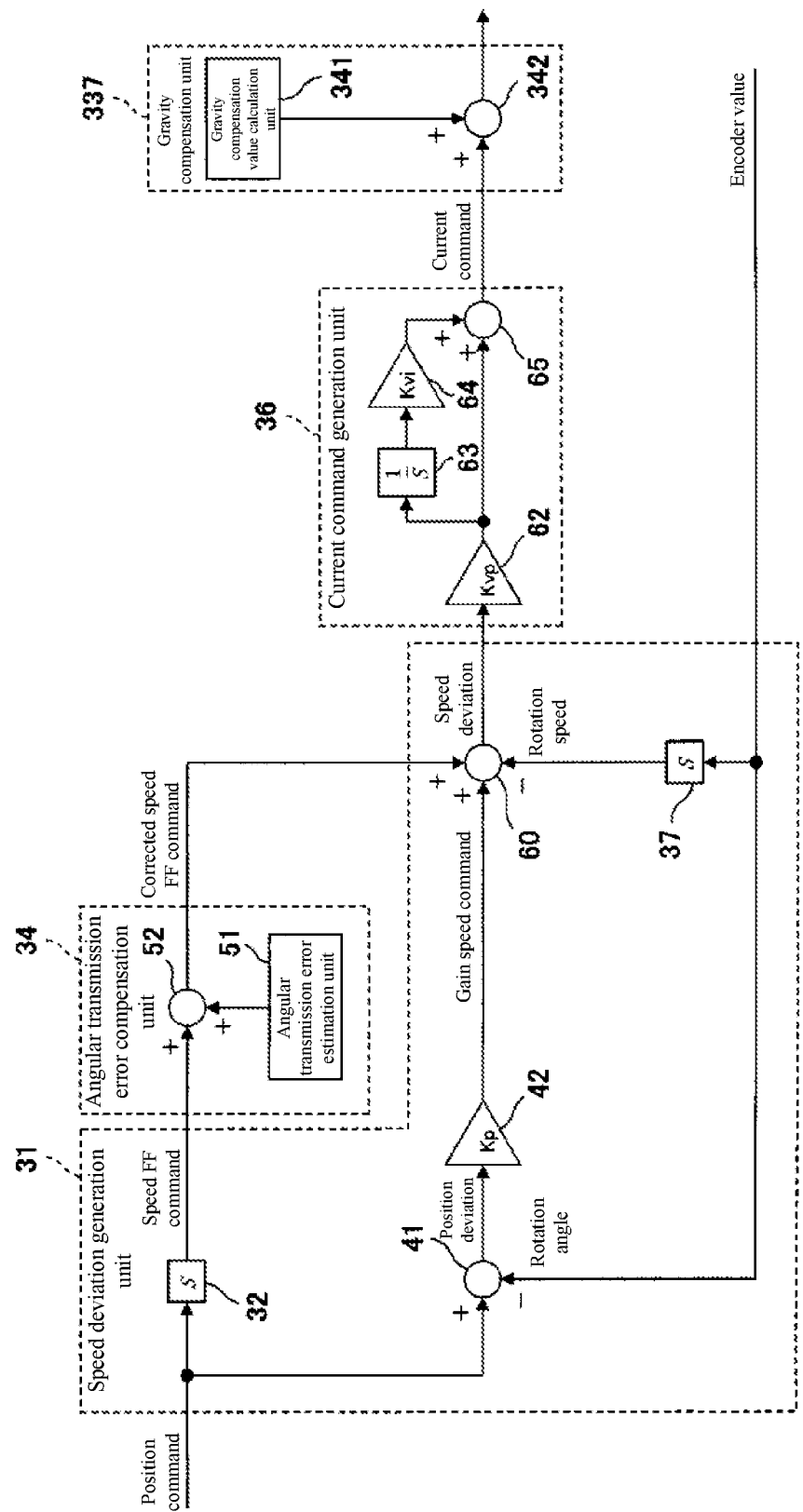
[Fig. 6]

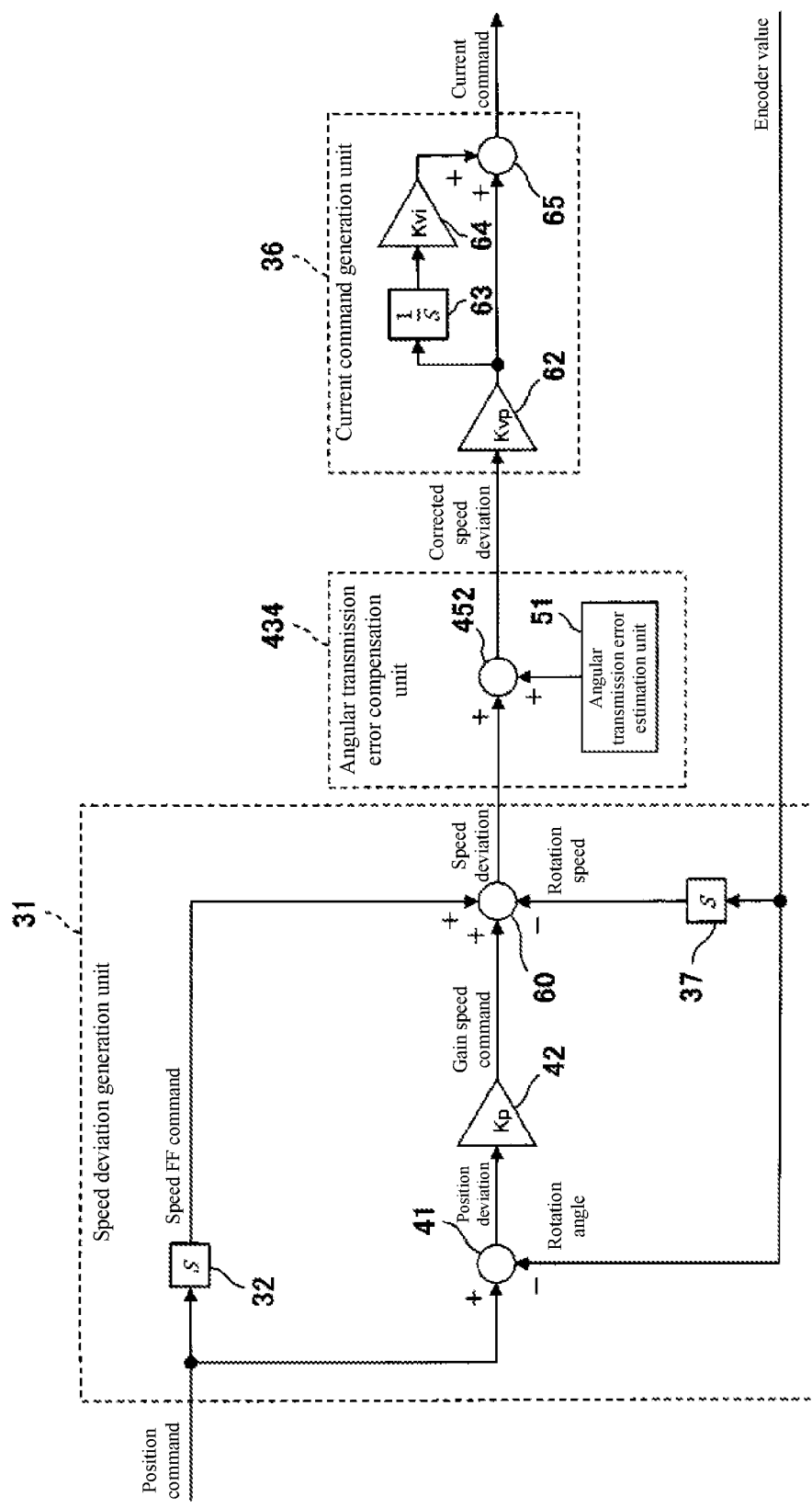
[Fig. 7]

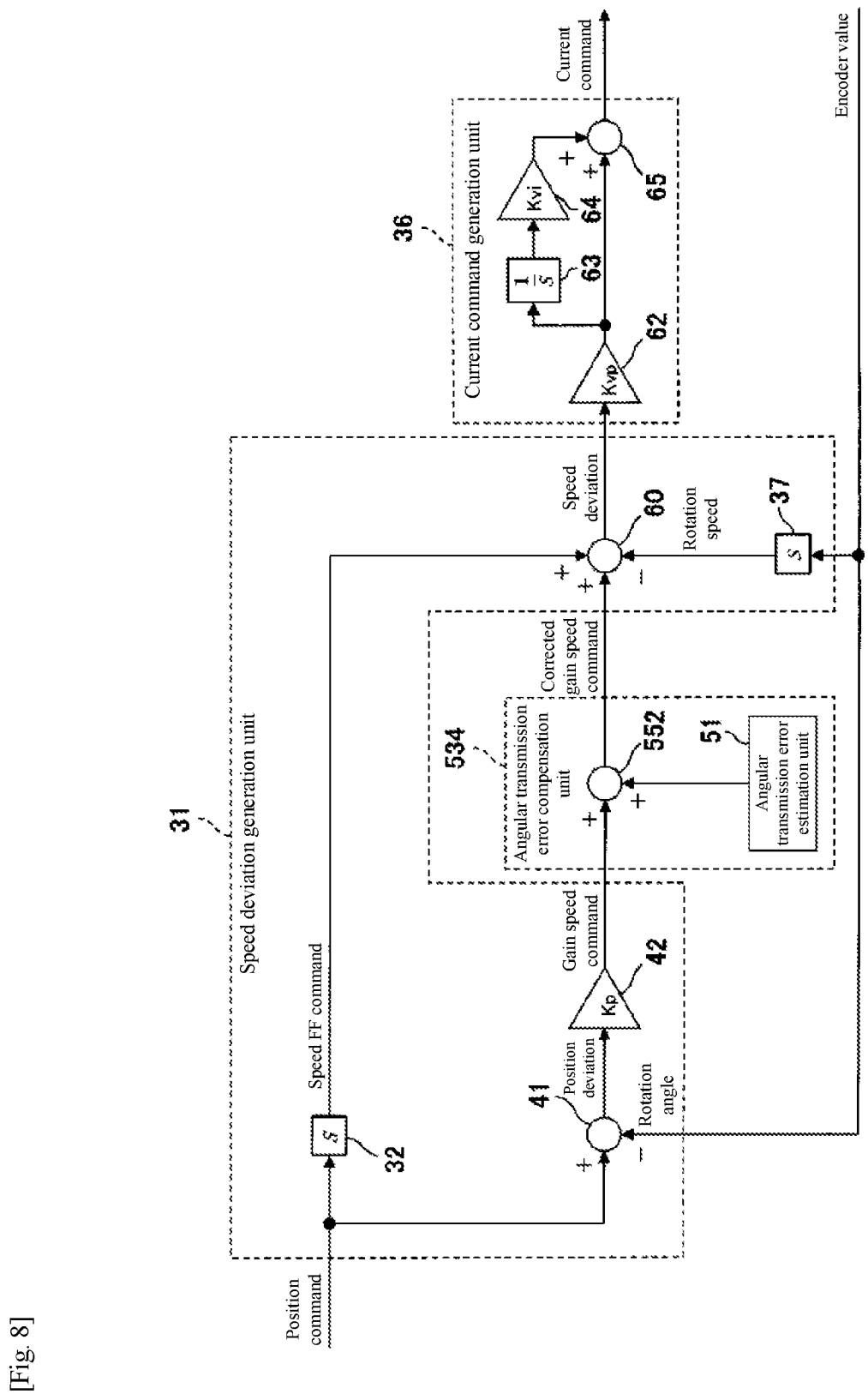
[Fig. 8]

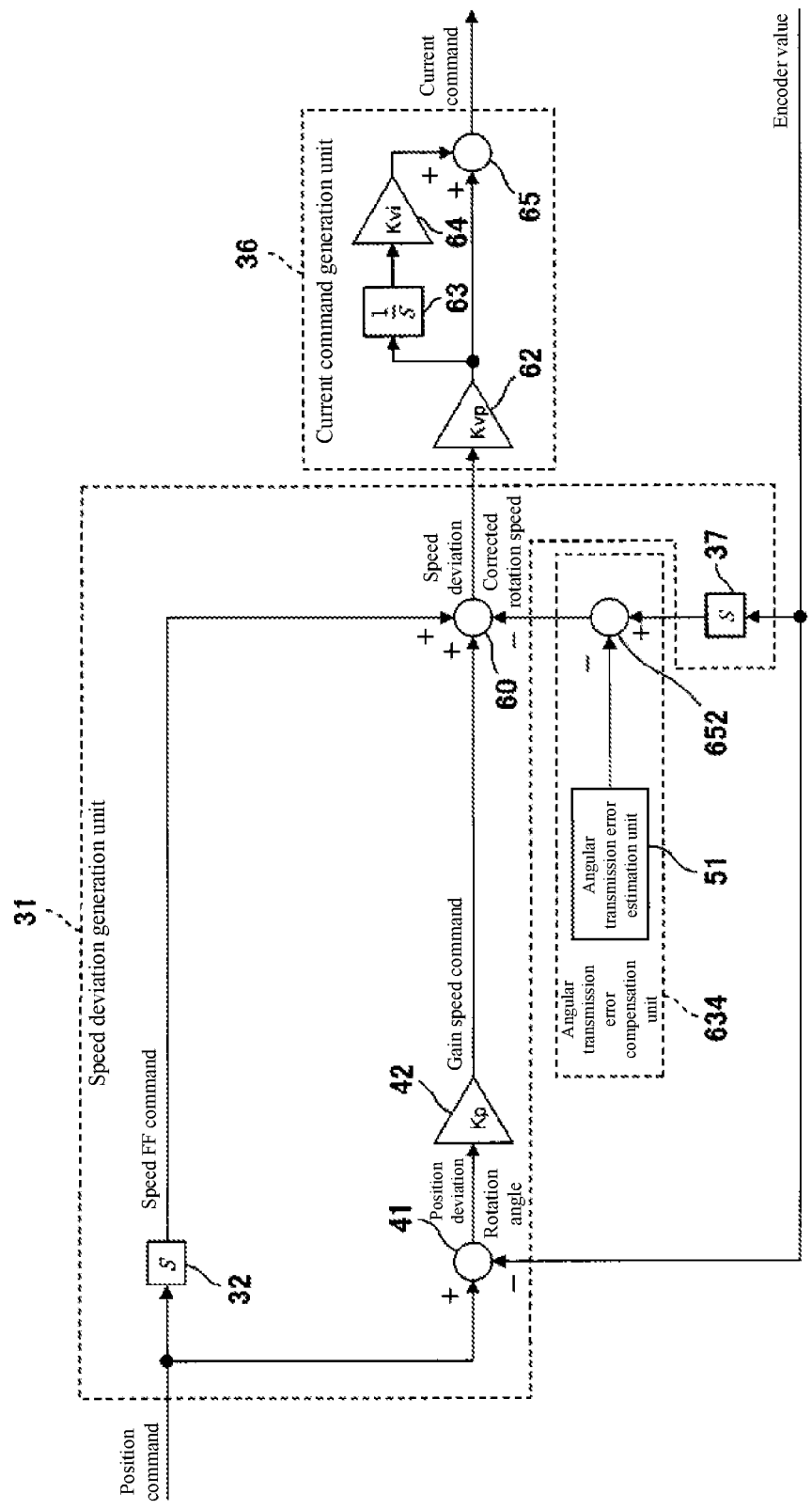
[Fig. 9]

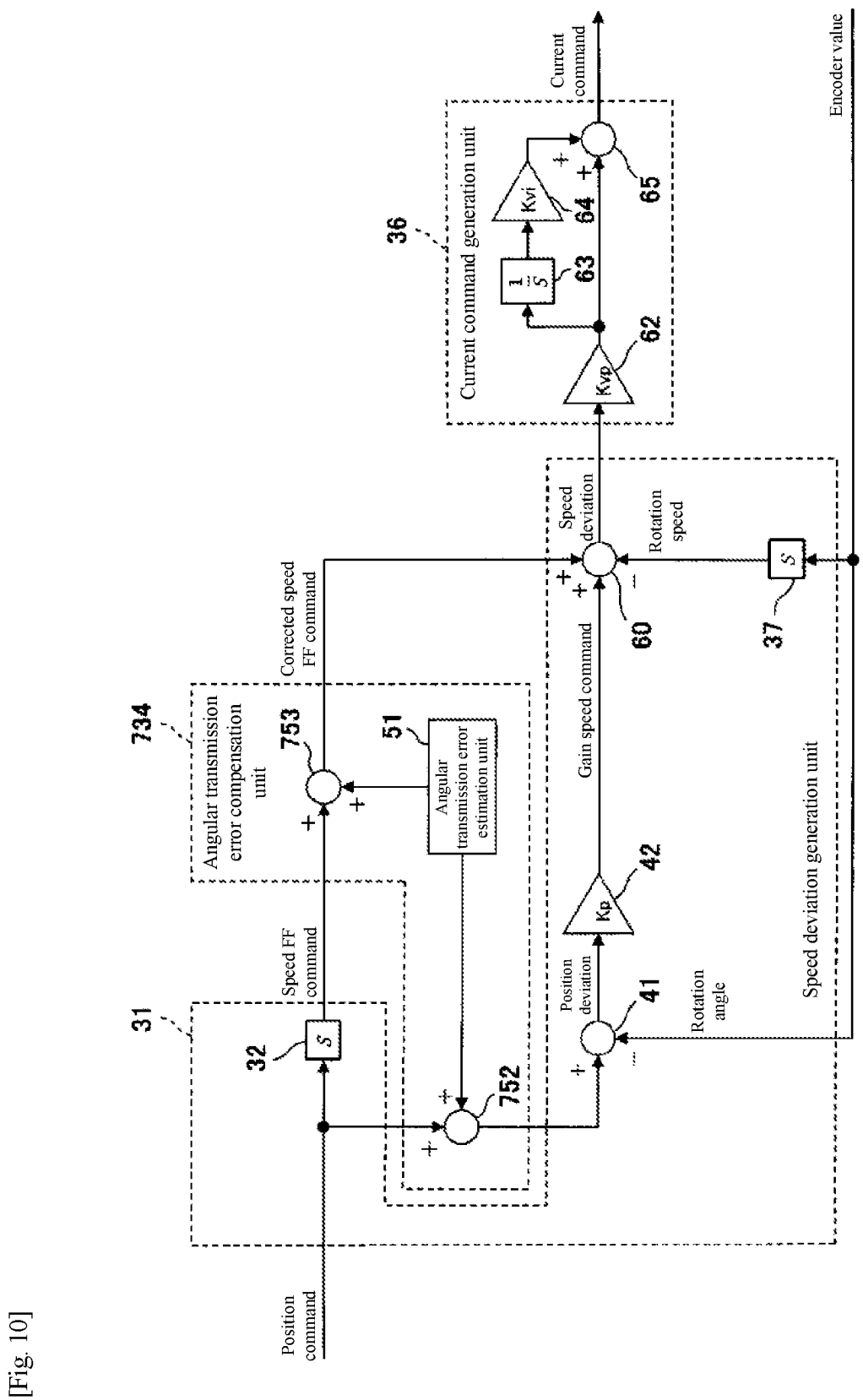
[Fig. 10]

MOTOR CONTROL SYSTEM, CONTROL METHOD FOR MOTOR CONTROL SYSTEM, AND ROBOT SYSTEM

TECHNICAL FIELD

The present invention relates to a motor control system, a control method for a motor control system, and a robot system.

BACKGROUND ART

Conventionally, a positioning system capable of correcting a positioning error caused by an angular transmission error of a speed reducer has been known (see, for example, Patent Literature 1).

This positioning system includes an error correction unit that corrects a position command based on error corrected data for correcting a positioning error of an output shaft of an actuator including a motor and a speed reducer, and sends the corrected position command to a driver that drives a motor. Thereby, the positioning error of the actuator can be corrected.

CITATION LIST

Patent Literature

PTL 1: JP2003-223225 A

SUMMARY OF INVENTION

Technical Problem

However, the positioning system described in Patent Literature 1 cannot appropriately suppress a variation in the rotation speed of the output shaft of the actuator, and sometimes the behavior of the load connected to the output shaft of the actuator becomes unstable.

Solution to Problem

In order to solve the above-mentioned problem, according to one mode, there is provided a motor control system that controls a motor by controlling a current supplied to the motor based on a position command input from a host device and controls an operation of a speed reducer including an input shaft connected to an output shaft of the motor and an output shaft connected to a load, the motor control system including: a detection unit that detects an event for detecting a rotation speed of the output shaft of the motor, a speed deviation generation unit that generates a speed command based on the position command and calculates a speed deviation which is a deviation between the speed command and the rotation speed of the output shaft of the motor detected based on the event detected by the detection unit; an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error; a current command generation unit that generates a current command based on the speed deviation; and a current control unit that controls a current supplied to the motor based on the current command.

According to this configuration, the angular transmission error can be compensated with a simple configuration, and the unstable behavior of the load due to the angular transmission error can be suppressed.

Advantageous Effects of Invention

The present invention has an effect that the unstable behavior of the load due to the angular transmission error can be suppressed.

BRIEF DESCRIPTION OF DRAWINGS

FIG. 1 is a diagram schematically showing a configuration example of a robot system according to the first embodiment.

FIG. 2 is a block diagram schematically showing a configuration example of a control system of the robot system in FIG. 1.

FIG. 3 is a block diagram schematically showing a configuration example of a control system of a servo control unit of the robot system in FIG. 1.

FIG. 4 is an explanatory diagram of an angular transmission error.

FIG. 5 is a graph showing a relationship between a speed feedforward command value and a corrected value of the speed feedforward command value in an operation example of a robot system according to the second embodiment.

FIG. 6 is a block diagram schematically showing a configuration example of a control system of a servo control unit of a robot system according to the third embodiment of the present invention.

FIG. 7 is a block diagram schematically showing a configuration example of a control system of a servo control unit of a robot system according to the fourth embodiment.

FIG. 8 is a block diagram schematically showing a configuration example of a control system of a servo control unit of a robot system according to the fifth embodiment.

FIG. 9 is a block diagram schematically showing a configuration example of a control system of a servo control unit of a robot system according to the sixth embodiment.

FIG. 10 is a block diagram schematically showing a configuration example of a control system of a servo control unit of a robot system according to the seventh embodiment.

DESCRIPTION OF EMBODIMENTS

According to one mode, there is provided a motor control system that controls a motor by controlling a current supplied to the motor based on a position command input from a host device and controls an operation of a speed reducer including an input shaft connected to an output shaft of the motor and an output shaft connected to a load, the motor control system including: a detection unit that detects an event for detecting a rotation speed of the output shaft of the motor; a speed deviation generation unit that generates a speed command based on the position command and calculates a speed deviation which is a deviation between the speed command and the rotation speed of the output shaft of the motor detected based on the event detected by the detection unit; an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error, a current command generation unit that generates a current command based on the speed deviation; and a current control unit that controls a current supplied to the motor based on the current command.

According to this configuration, the angular transmission error can be compensated with a simple configuration, and the unstable behavior of the load due to the angular transmission error can be suppressed.

The speed command may be a speed feedforward command obtained by time-differentiating the position command.

According to this configuration, the speed of the motor can be appropriately controlled according to the speed feedforward command for controlling the rotation speed of the output shaft of the motor.

The angular transmission error compensation unit may correct the speed command by correcting the speed feedforward command based on the estimated angular transmission error.

According to this configuration, the speed command can be appropriately corrected by correcting the speed feedforward command for controlling the rotation speed of the output shaft of the motor, and the angular transmission error can be appropriately compensated.

The detection unit may detect an event for detecting a rotation angle and a rotation speed of the output shaft of the motor, and the speed command may be a value obtained by adding a speed feedforward command obtained by time-differentiating the position command, and a gain speed command obtained by multiplying a deviation between the position command and the rotation angle of the output shaft of the motor detected based on the event detected by the detection unit by a position proportional gain.

According to this configuration, the speed of the motor can be appropriately controlled according to the speed feedforward command for controlling the rotation speed of the output shaft of the motor, and the rotation angle of the motor can be appropriately controlled according to the gain speed command.

The angular transmission error compensation unit may correct the speed command by correcting the speed feedforward command based on the estimated angular transmission error.

According to this configuration, the speed command can be appropriately corrected by correcting the speed feedforward command for controlling the rotation speed of the output shaft of the motor, and the angular transmission error can be appropriately compensated.

The angular transmission error compensation unit may further correct the position command based on the estimated angular transmission error, and the speed command may be a value obtained by adding a speed feedforward command obtained by time-differentiating the position command input from the host device and a gain speed command obtained by multiplying a deviation between the corrected position command and the rotation angle of the output shaft of the motor detected based on the event detected by the detection unit by a position proportional gain.

According to this configuration, the angular transmission error can be compensated more appropriately.

The angular transmission error compensation unit may estimate the angular transmission error based on a periodic function that models a periodic variation of the angular transmission error.

According to this configuration, the angular transmission error that appears as a periodic error can be appropriately compensated.

The speed reducer may be a strain wave gearing.

According to this configuration, the unstable behavior of the load due to the angular transmission error of the strain wave gearing can be suppressed.

According to one mode, there is provided a control method for a motor control system that controls a motor by controlling a current supplied to the motor based on a position command input from a host device and controls an operation of a speed reducer including an input shaft connected to an output shaft of the motor and an output shaft connected to a load, the motor control system including: a detection unit that detects an event for detecting a rotation speed of the output shaft of the motor, a speed deviation generation unit that generates a speed command based on the position command and calculates a speed deviation which is a deviation between the speed command and the rotation speed of the output shaft of the motor detected based on the event detected by the detection unit; an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error, a current command generation unit that generates a current command based on the speed deviation; and a current control unit that controls a current supplied to the motor based on the current command.

According to this configuration, the angular transmission error can be compensated with a simple configuration, and the unstable behavior of the load due to the angular transmission error can be suppressed.

According to one mode, there is provided a robot system including: a robot arm; a motor which is a drive source of a joint of the robot arm; a speed reducer including an input shaft connected to an output shaft of the motor and an output shaft connected to the joint of the robot arm; a command unit that generates a position command; and a motor control system that controls an operation of the motor by controlling a current supplied to the motor based on the position command generated by the command unit, in which the motor control system includes: a detection unit that detects an event for detecting a rotation speed of the output shaft of the motor; a speed deviation generation unit that generates a speed command based on the position command and calculates a speed deviation which is a deviation between the speed command and the rotation speed of the output shaft of the motor detected based on the event detected by the detection unit; an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error, a current command generation unit that generates a current command based on the speed deviation; and a current control unit that controls a current supplied to the motor based on the current command.

According to this configuration, the angular transmission error can be compensated with a simple configuration, and the vibration of the robot arm caused by the angular transmission error can be suppressed.

Hereinafter, embodiments will be described with reference to the drawings. Note that the present invention is not limited to the present embodiment. Note that, in the followings, the same or corresponding elements are denoted by the same reference symbols throughout all the drawings, and redundant description thereof is omitted.

First Embodiment

FIG. 1 is a diagram schematically showing a configuration example of a robot system 100 according to the first embodiment. FIG. 2 is a block diagram schematically showing a configuration example of a control system of the robot system 100.

As shown in FIG. 1, the robot system 100 is used for industrial applications, for example. The robot system 100 includes a robot 1 including a robot arm and a robot control device 2 that controls the operation of the robot 1.

The robot 1 is an industrial robot which is an articulated robot (multi-joint robot), includes a plurality of joints 10 and a robot arm having a hand 14 at the distal end. As shown in FIG. 2, each joint 10 is provided with a drive unit that drives the joint 10, and the drive unit includes a servomotor (motor) 11, an encoder 12, and a speed reducer 13. The robot 1 is not limited to an articulated robot. In the present embodiment, the robot arm of the robot 1 is configured so that six joints are arranged in a line.

The encoder (detection unit) 12 detects an event for detecting the actual rotation angle and the actual rotation speed of an output shaft 11a of the servomotor 11. In the present embodiment, the encoder 12 outputs information including the actual rotation angle of the output shaft 11a of the servomotor 11 based on the detected event. Then, an encoder value differentiation unit 37, which will be described in detail later, calculates the actual rotation speed of the output shaft 11a of the servomotor 11 by time-differentiating the actual rotation angle of the output shaft 11a of the servomotor 11.

The speed reducer 13 includes an input shaft 13a connected to the output shaft 11a of the servomotor 11 and an output shaft 13b connected to the joint 10 (load) of the robot 1. The input shaft 13a may be integrated with the output shaft 11a of the servomotor 11. Further, the speed reducer 13 may be configured of one device or a plurality of devices. The speed reducer 13 decelerates the rotation of the output shaft 11a of the servomotor 11 input to the input shaft 13a at a predetermined reduction ratio R, and outputs it from the output shaft 13b. The speed reducer 13 is, for example, a strain wave gearing (Harmonic Drive (registered trademark)). However, it is not limited to this.

The strain wave gearing includes a circular spline, a flex spline, and a wave generator. The circular spline is a rigid internal gear, and is provided integrally with the housing for example. The flex spline is a flexible external gear and meshes with the circular spline. The flex spline has fewer teeth than the circular spline and is connected to the output shaft 13b. The wave generator is an elliptical cam that is in contact with the inner side of the flex spline, and is connected to the input shaft 13a. Then, by rotating the input shaft 13a, the wave generator moves the meshing position between the flex spline and the circular spline, and the flex spline rotates around the rotary axis according to the difference in the number of teeth between the circular spline and the flex spline, so that the output shaft 13b rotates. The strain wave gearing has characteristics suitable for a speed reducer of a robot drive mechanism because of its features such as small size and light weight, high reduction ratio, high torque capacity, and non-backlash.

[Configuration Example of Robot Control Device]

As shown in FIG. 2, the robot control device 2 includes a command unit 21, a servo control unit 22 provided corresponding to each joint, and a servo amplifier 23 provided corresponding to each joint. The servo control unit 22 and the servo amplifier 23 constitute a motor control system. The motor control system controls the operation of the servomotor 11 by controlling the current supplied to the servomotor 11 based on the position command input from the command unit 21 which is a host device, and controls the operation of the speed reducer 13 in which the input shaft 13a is connected to the output shaft 11a of the servomotor 11 and the output shaft 13b is connected to the load. In this embodiment, the load is the joint 10 of the robot arm of the robot 1, and the working end of the robot arm (end where the hand is provided) can be moved by turning the joint 10.

The command unit 21 generates a position command based on the operation program and outputs the position command. The output position command is input to the servo control unit 22. In the present embodiment, the position command is a control amount for controlling the position of the output shaft 11a of the servomotor 11, and is a rotation angle of the output shaft 11a of the servomotor 11.

FIG. 3 is a block diagram schematically showing a configuration example of a control system of the servo control unit of the robot system. Note that gravity compensation and dynamic compensation may be performed on the position command.

The servo control unit 22 generates a current command based on the position command generated by the command unit 21. As shown in FIG. 3, the servo control unit 22 includes a speed deviation generation unit 31, an angular transmission error compensation unit 34, and a current command generation unit 36.

The speed deviation generation unit 31, the angular transmission error compensation unit 34, and the current command generation unit 36 are functional blocks that are realized when a calculation unit (not shown) executes a predetermined control program. The calculation unit is configured by a calculator such as a programmable logic device (PLD) such as a microcontroller, CPU, ASIC, or FPGA. The calculation unit may be configured by a single controller that performs centralized control, or may be configured by a plurality of controllers that perform distributed control in cooperation with each other. Further, the robot control device 2 includes a storage device (not shown) that stores various programs and data.

The speed deviation generation unit 31 generates a speed command based on the position command, and calculates a speed deviation which is a deviation between the speed command and the actual rotation speed of the output shaft 11a of the servomotor 11 detected based on the event detected by the encoder 12.

The speed deviation generation unit 31 includes a speed feedforward command generation unit 32, a position deviation calculation unit 41, a gain speed command generation unit 42, a speed deviation calculation unit 60, and an encoder value differentiation unit 37.

The speed feedforward command generation unit 32 generates a speed feedforward command based on the position command. The speed feedforward command generation unit 32 includes a differentiator that time-differentiates the position command, and generates a speed feedforward command by time-differentiating the position command.

The position deviation calculation unit 41 calculates the positional deviation which is the deviation between the position command and the actual rotation angle of the output shaft 11a of the servomotor 11 output from the encoder 12 by subtracting the actual rotation angle of the output shaft 11a of the servomotor 11 from the position command.

The gain speed command generation unit 42 calculates a value obtained by multiplying the position deviation calculated by the position deviation calculation unit 41 by the position proportional gain Kp. This calculated value constitutes the gain speed command. In this manner, the gain speed command generation unit 42 performs P control (proportional control).

The encoder value differentiation unit 37 calculates the actual rotation speed of the output shaft 11a of the servomotor 11 based on the actual rotation angle of the output shaft 11a of the servomotor 11 output from the encoder 12. The encoder value differentiation unit 37 includes a differentiator that time-differentiates the actual rotation angle of the output shaft 11a of the servomotor 11, and calculates the actual rotation speed of the output shaft 11a of the servomotor 11 by time-differentiating the actual rotation angle of the actual output shaft 11a of the servomotor 11.

The speed deviation calculation unit 60 adds a corrected speed feedforward command (details will be described later) obtained by correcting the speed feedforward command and a gain speed command to generate a speed command. Further, the speed deviation calculation unit 60 calculates a speed deviation which is a deviation between the speed command and the rotation speed of the output shaft 11a of the servomotor 11 calculated by the encoder value differentiation unit 37. Note that the order of addition/subtraction of the corrected speed feedforward command, the gain speed command, and the rotation speed of the output shaft 11a of the servomotor 11 in the speed deviation calculation unit 60 is not limited to this.

The angular transmission error compensation unit 34 estimates an angular transmission error between the rotation angle of the output shaft 11a of the servomotor 11 (rotation angle of the input shaft 13a of the speed reducer 13) and the rotation angle of the output shaft 13b of the speed reducer 13. Further, the angular transmission error compensation unit 34 corrects the speed feedforward command based on the estimated angular transmission error, and generates a corrected speed feedforward command. The angular transmission error compensation unit 34 includes an angular transmission error estimation unit 51 and a correction unit 52.

By the way, as shown in FIG. 4, in the speed reducer including the strain wave gearing, there occurs an angular transmission error which is a difference between a theoretical output rotation angle obtained by multiplying an input rotation angle input to the speed reducer by a reduction ratio and the actual output rotation angle due to a processing error or the like. This angular transmission error changes periodically along with the rotation of the output shaft of the motor. Such an angular transmission error ATE of the output shaft of the speed reducer can be approximately expressed by a model using a function according to the following equation (1).

[Equation 1]

$$ATE = A \sin(f\theta + \phi) \quad (1)$$

Note that,
A is amplitude of angular transmission error model function
f is frequency of angular transmission error model function (number of waves of angular transmission error per rotation of output shaft of motor)

θ is rotation angle of output shaft of servomotor (input shaft of speed reducer)
φ is phase of angular transmission error model function The angular transmission error estimation unit 51 estimates the angular transmission error between the rotation angle of the output shaft 11a of the servomotor 11 which is the input rotation angle with respect to the speed reducer 13 and the rotation angle of the output shaft 13b of the speed reducer 13 which is the output rotation angle of the speed reducer 13 based on the periodic function that models the periodic variation of the angular transmission error according to the above equation (1), and determines a compensation amount θ (•) comp to be applied to the output shaft 11a of the servomotor 11 to compensate the angular transmission error (to cancel the angular transmission error). Here, θ (•) is assumed to be a symbol in which one symbol "." (dot) is added on θ. In the present embodiment, the angular transmission error estimation unit 51 calculates the compensation amount θ (•) comp to be applied to the output shaft 11a of the servomotor 11 based on the following equation (2).

[Equation 2]

$$\dot{\theta}_{comp} = -Af\dot{\theta}R \cos(f\theta + \phi) \quad (2)$$

Note that,
A is amplitude of angular transmission error model function
f is frequency of angular transmission error model function (number of waves of angular transmission error per rotation of output shall of motor)
θ is position command value
$\dot{\theta}$ is speed feedforward command value
φ is phase of angular transmission error model function
R is reduction ratio Equation (2) is obtained by time-differentiating the equation (1), further adding a negative sign to the reduction ratio, and multiplying this, and the amplitude A and the phase difference p in the equations (1) and (2) are predefined. For example, it has been found that a component having a frequency of 2 has a particularly great influence on the angular transmission error of the strain wave gearing. Therefore, when the speed reducer 13 is a strain wave gearing the frequency f may be defined as 2, and the compensation amount θ (•) comp may be calculated based on the above function using the separately identified amplitude A and phase p corresponding to the frequency f. As described above, the angular transmission error estimation unit 51 estimates the angular transmission error based on the values of the position command and the speed feedforward command (time differential value of the position command).

The correction unit 52 adds the compensation amount θ (•) comp to the speed feedforward command value to generate a corrected speed feedforward command.

In this manner, in the angular transmission error compensation unit 34, the correction unit 52 corrects the speed feedforward command value based on the angular transmission error estimated by the angular transmission error estimation unit 51, and generates a corrected speed feedforward command. As described above, the speed deviation calculation unit 60 adds the corrected speed feedforward command and the gain speed command to generate a speed command.

As described above, the angular transmission error compensation unit 34 indirectly corrects the speed command and further indirectly corrects the correction deviation by correcting the speed feedforward command.

The current command generation unit 36 generates a current command based on the speed deviation generated by the speed deviation generation unit 31. The current command is a control amount for controlling the current supplied to the winding of the servomotor 11.

For example, the current command generation unit 36 includes a speed proportional gain unit 62, an integration unit 63, a speed integration gain unit 64, and an addition/subtraction unit 65. The speed proportional gain unit 62 calculates the value of the first command obtained by multiplying the speed deviation calculated by the speed deviation calculation unit 60 by the speed proportional gain Kvp. The integration unit 63 integrates the value of the first command. The speed integration gain unit 64 calculates the value of the second command obtained by multiplying the value integrated by the integration unit 63 by the speed integration gain Kvi. The addition/subtraction unit 65 calculates a value obtained by adding the value of the first command calculated by the speed proportional gain unit 62 and the value of the second command calculated by the speed integration gain unit 64, and outputs this value as a current command. That is, the current command generation unit 36 is configured to perform PI control (proportional integral control). The output current command is input to the servo amplifier 23.

The servo amplifier (current control unit) 23 controls the current supplied to the servomotor 11 based on the current command generated by the current command generation unit 36.

By the way, if a correction to compensate the angular transmission error is added to the position command and the speed command is generated, this correction is canceled in the process of calculating the speed deviation that is the subsequent process performed after the speed command generation, and the angular transmission error may not be appropriately compensated. However, in the present embodiment, the angular transmission error compensation unit 34 estimates the angular transmission error between the rotation angle of the output shaft 11a of the servomotor 11 and the rotation angle of the output shaft 13b of the speed reducer 13, and corrects the speed command by correcting the lower command than the position command, that is, the speed feedforward command to correct the speed deviation, so that the angular transmission error can be appropriately compensated.

As described above, the angular transmission error compensation unit 34 corrects the speed feedforward command for controlling the rotation speed of the output shaft 11a of the servomotor 11, and the rotation speed of the output shaft 11a of the servomotor 11 is configured to be controlled according to the corrected speed feedforward command which is corrected. That is, the robot control device 2 controls the output shaft 11a of the servomotor 11 to rotate at a speed that compensates the angular transmission error.

As described above, in the robot system 100, the angular transmission error compensation unit 34 corrects the speed command by correcting the speed feedforward command and corrects the speed deviation. Therefore, the angular transmission error can be compensated with a simple configuration, and unstable load behavior (vibration or the like) due to the angular transmission error can be suppressed.

In particular, in the robot 1 which is a vertical articulated robot, the variation of the tuning speed of the joint caused by the angular transmission error appears as the vibration of the hand 14. Therefore, by suppressing the variation of the turning speed of the joint caused by the angular transmission error, the vibration of the hand 14 caused by the angular transmission error can be suppressed, and the positioning accuracy can be improved.

Further, the angular transmission error compensation unit 34 corrects the speed command by correcting the speed feedforward command, and corrects the speed deviation. Therefore, in the robot system 100 that controls the servomotor 11 using the speed feedforward command, the speed command can be appropriately corrected, and the angular transmission error can be appropriately compensated.

Second Embodiment

Hereinafter, the configuration and operation of the second embodiment will be described focusing on the differences from the first embodiment.

FIG. 5 is a graph showing a relationship between a speed feedforward command and a corrected value of the speed feedforward command in an operation example of a robot system according to the second embodiment.

In the first embodiment described above, the angular transmission error estimation unit 51 uses the value of the speed feedforward command to calculate the compensation amount θ (•) comp to be applied to the output shaft 11a of the servomotor 11 as the equation (2).

On the other hand, in the present embodiment, the angular transmission error estimation unit 51 first calculates θ (•) a by correcting the value of the speed feedforward command θ (•) based on the equations (3) to (5).

[Equation 3]

$$\begin{cases} \dot{\theta}_a = \dot{\theta} & (0 \le \dot{\theta} \le vlim) \quad (3) \\ \dot{\theta}_a = -k\dot{\theta} + (k+1)vlim & \left(vlim < \dot{\theta} \le \frac{k+1}{k}vlim\right) \quad (4) \\ \dot{\theta}_a = 0 & \left(\frac{k+1}{k}vlim < \dot{\theta}\right) \quad (5) \end{cases}$$

Note that,
$\dot{\theta}$ is speed feedforward command value
$\dot{\theta}_a$ is corrected value of speed feedforward command value
k is predetermined coefficient
vlim is upper limit value of speed feedforward command value FIG. 5 is a graph of the equations (3) to (5). When the speed feedforward command value θ (•) is equal to or less than vlim, the speed feedforward command value θ (•) is directly set as the correction value θ (•) a of the speed feedforward command value, based on the equation (3).

When the speed feedforward command value θ (•) exceeds vlim, the corrected value θ (•) a of the speed feedforward command value is set to be reduced as the speed feedforward command value θ increases, based on the equation (4).

In addition, when vlim exceeds the value at which the correction value θ (•) a of the speed feedforward command becomes 0 in the equation (4), the correction value θ (•) a of the speed feedforward command is set to 0 based on the equation (5).

Next, the angular transmission error estimation unit 51 uses the correction value θ (•) a of the speed feedforward command value to calculate the compensation amount θ (•) comp to be added to the output shaft 11a of the servomotor 11, based on the equation (6).

[Equation 4]

$$\dot{\theta}_{comp} = -Af\dot{\theta}_a R \cos(f\theta+\phi) \quad (6)$$

Note that,

A is amplitude of angular transmission error model function f is frequency of angular transmission error model function (number of waves of angular transmission error per rotation of output shaft of motor)

θ is position command value $\dot{\theta}_a$ is corrected value of speed feedforward command value calculated based on equations (3) to (5)

ϕ is phase of angular transmission error model function

R is reduction ratio

That is, when the speed feedforward command value θ (•) is equal to or less than vlim, the compensation amount θ (•) comp in the present embodiment is set to be the same as the compensation amount θ (•) comp in the first embodiment described above.

On the other hand, when the speed feedforward command value θ (•) exceeds vlim, the compensation amount θ (•) comp in the present embodiment is set smaller than the compensation amount θ (•) comp in the first embodiment described above, and in particular, as shown in the equation (5), when the speed feedforward command value θ (•) becomes a predetermined value or more, the compensation amount θ (•) comp is set to 0.

As described above, when the speed feedforward command value θ (•) exceeds a predetermined value, the compensation amount θ (•) comp is set smaller or not compensated. As a result, the compensation amount θ (•) comp can be prevented from becoming excessively large, and problems in control can be prevented from occurring. Furthermore, it is possible to simplify the control in a region that is operated at a high speed where high accuracy is not normally required.

Further, in the present embodiment, in the range of the speed feedforward command value shown in the equation (4), as the speed feedforward command value θ (•) increases, the correction value θ (•) a of the speed feedforward command value is set to be reduced. Therefore, it is possible to prevent the operation of the robot 1 from changing abruptly when the speed feedforward command value θ (•) changes across vlim.

Third Embodiment

Hereinafter, the configuration and operation of the third embodiment will be described focusing on the differences from the first embodiment.

FIG. 6 is a block diagram schematically showing a configuration example of a control system of a servo control unit 22 of a robot system according to the third embodiment.

In the present embodiment, the servo control unit 22 further includes a gravity compensation unit 337.

The gravity compensation unit 337 is a functional unit for performing compensation for canceling the influence of gravity acting on the robot 1. The gravity compensation unit 337 includes a gravity compensation value calculation unit 341 and a correction unit 342. The gravity compensation value calculation unit 341 calculates a gravity compensation value G for canceling the gravitational torque acting on the joint 10 of the robot 1. The correction unit 342 adds the gravity compensation value G to the current command value.

Incidentally, the phase difference between the output shaft 11a of the servomotor 11 and the output shaft 13b of the speed reducer 13 changes in proportion to the torque applied to the output shaft 13b of the speed reducer 13. Therefore, the change can be approximately expressed by a model expressed as the following function.

[Equation 5]

$$\varphi = aG + \phi_0 \quad (7)$$

Note that,

φ is phase of angular transmission error model function a is gravitational torque-phase proportionality constant G is gravitational torque $\phi_0$ is phase of angular transmission error when gravitational torque is 0

In the present embodiment, the angular transmission error estimation unit 51 uses the gravity compensation value G calculated by the gravity compensation value calculation unit 341 to calculate φ used for calculation of the compensation amount θ (•) comp to be applied to the output shaft 11a of the servomotor 11 based on the equation (2), based on the above equation (7). The proportionality constant a and the phase $\phi_0$ are identified in advance. Then, the angular transmission error estimation unit 51 uses φ which is used based on the equation (7) to calculate the compensation amount θ (•) comp to be applied to the output shaft 11a of the servomotor 11 based on the equation (2). Thus, the servo control unit 22 can perform angular transmission error compensation more accurately.

Fourth Embodiment

Hereinafter, the configuration and operation of the fourth embodiment will be described focusing on the differences from the first embodiment.

FIG. 7 is a block diagram schematically showing a configuration example of a control system of a servo control unit of a robot system according to the fourth embodiment.

In the first embodiment described above, the angular transmission error compensation unit 34 indirectly corrects the speed command by correcting the speed feedforward command and indirectly corrects the speed deviation. On the other hand, in the present embodiment, an angular transmission error compensation unit 434 corrects the speed deviation as shown in FIG. 7.

That is, the speed deviation calculation unit 60 adds the speed feedforward command and the gain speed command to generate a speed command. Further, the speed deviation calculation unit 60 calculates a speed deviation which is a deviation between the speed command and the rotation speed of the output shaft 11a of the servomotor 11.

Then, the correction unit 452 of the angular transmission error compensation unit 434 calculates the corrected speed deviation by adding the compensation amount θ (•) comp to the speed deviation.

In addition, the current command generation unit 36 generates a current command based on the corrected speed deviation generated by the angular transmission error compensation unit 434. That is, the speed proportional gain unit 62 generates a first command obtained by multiplying the correction deviation calculated by the correction unit 452 of the angular transmission error compensation unit 434 by the speed proportional gain Kvp.

Fifth Embodiment

Hereinafter, the configuration and operation of the fifth embodiment will be described focusing on the differences from the first embodiment.

FIG. 8 is a block diagram schematically showing a configuration example of a control system of a servo control unit of a robot system according to the fifth embodiment.

In the first embodiment described above, the angular transmission error compensation unit 34 indirectly corrects the speed command by correcting the speed feedforward command and indirectly corrects the speed deviation. On the other hand, in the present embodiment, as shown in FIG. 8, an angular transmission error compensation unit 534 indirectly corrects the speed command by correcting the gain speed command and indirectly corrects the speed deviation.

That is, the correction unit 552 of the angular transmission error compensation unit 534 calculates a corrected gain speed command by adding the compensation amount θ (•) comp to the gain speed command. Then, the speed deviation calculation unit 60 calculates the speed command by adding the speed feedforward command and the corrected gain speed command. Further, the speed deviation calculation unit 60 calculates a speed deviation which is a deviation between the speed command and the rotation speed of the output shaft 11a of the servomotor 11.

Sixth Embodiment

Hereinafter, the configuration and operation of the sixth embodiment will be described focusing on the differences from the first embodiment.

FIG. 9 is a block diagram schematically showing a configuration example of a control system of a servo control unit of a robot system according to the sixth embodiment.

In the first embodiment described above, the angular transmission error compensation unit 34 indirectly corrects the speed command by correcting the speed feedforward command and indirectly corrects the speed deviation. On the other hand, in the present embodiment, as shown in FIG. 9, an angular transmission error compensation unit 634 indirectly corrects the speed deviation by correcting the rotation speed of the output shaft 11a of the servomotor 11.

That is, a correction unit 652 of the angular transmission error compensation unit 634 calculates a corrected rotation speed by subtracting the compensation amount θ (•) comp from the rotation speed of the output shat 11a of the servomotor 11.

Then, the speed deviation calculation unit 60 calculates a speed deviation which is a deviation between the speed command and the corrected rotation speed.

Seventh Embodiment

Hereinafter, the configuration and operation of the seventh embodiment will be described focusing on the differences from the first embodiment.

FIG. 10 is a block diagram schematically showing a configuration example of a control system of a servo control unit of a robot system according to the seventh embodiment.

In the first embodiment described above, the angular transmission error compensation unit 34 indirectly corrects the speed command by correcting the speed feedforward command and indirectly corrects the speed deviation. On the other hand, in the present embodiment, an angular transmission error compensation unit 734 corrects the position command and the speed feedforward command based on the estimated angular transmission error as shown in FIG. 10. The angular transmission error compensation unit 734 includes an angular transmission error estimation unit 51, a first correction unit 752, and a second correction unit 753.

The first correction unit 752 calculates a corrected position command by adding a compensation amount θ (•) comp to the position command.

Since the second correction unit 753 is the same as the correction unit 52, detailed description thereof is omitted.

The speed feedforward command generation unit 32 generates a speed feedforward command based on the position command before correction.

The position deviation calculation unit 41 calculates a position deviation which is a deviation between the position command and the rotation angle of the output shaft 11a of the servomotor 11 by subtracting the rotation angle of the output shaft 11a of the servomotor 11 from the corrected position command.

Eighth Embodiment

Hereinafter, the configuration and operation of the eighth embodiment will be described focusing on the differences from the first embodiment.

In the first embodiment described above, the angular transmission error estimation unit 51 of the angular transmission error compensation unit 34 calculates the compensation amount θ (•) comp using a predetermined frequency f that has a particularly great influence on the angular transmission error and a predetermined amplitude A and a predetermined phase difference p corresponding to this frequency when calculating the compensation amount θ (•) comp to be applied to the output shaft 11a of the servomotor 11 based on the equation (2). Instead, the angular transmission error estimation unit 51 of the angular transmission error compensation unit 34 may calculate the compensation amount θ (•) comp to be applied to the output shaft 11a of the servomotor 11 based on the following equation (8).

[Equation 6]

$$\dot{\theta}_{comp} = \sum_i -A_i f_i \dot{\theta} R \cos(f_i \theta + \phi_i) \quad (8)$$

Note that,
i is pattern of frequency
$A_i$ is amplitude of angular transmission error model function corresponding to pattern of frequency
$f_i$ is frequency of angular transmission error model function corresponding to pattern of frequency (number of waves of angular transmission error per rotation of motor)
θ is position command value
$\dot{\theta}$ is speed feedforward command value
$\phi_i$ is phase of angular transmission error model function corresponding to pattern of frequency
R is reduction ratio That is, the angular transmission error estimation unit 51 calculates the angular transmission error for each frequency pattern based on the values of the position command and the speed feedforward command (time differential value of the position command), and uses the value obtained by adding these for correction of the angular transmission error. Thereby, the angular transmission error can be corrected more accurately.

Based on the foregoing description, it is apparent for a person skilled in the art that many modifications and other embodiments may be made to the present invention. Therefore, the foregoing description should be interpreted only as an example and is provided for the purpose of teaching the best mode for carrying out the present invention to a person skilled in the art. The structures and/or functional details may be substantially modified without departing from the spirit of the present invention.

REFERENCE SIGNS LIST 1 robot
2 robot control device
10 turning shaft
11 servomotor
11a output shaft
12 encoder
13 speed reducer
13a input shaft
13b output shaft
22 servo control unit
23 servo amplifier
31 speed deviation calculation unit
34 angular transmission error compensation unit
36 current command generation unit
100 robot system

The invention claimed is:

1. A motor control system that controls a motor by controlling a current supplied to the motor based on a position command input from a host device and controls an operation of a speed reducer including an input shaft connected to an output shaft of the motor and an output shaft connected to a load, the motor control system comprising:
a detection unit that detects an event for detecting a rotation speed of the output shaft of the motor;
a speed deviation generation unit that generates a speed command based on the position command and calculates a speed deviation which is a deviation between the speed command and the rotation speed of the output shaft of the motor detected based on the event detected by the detection unit;
an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error;
a current command generation unit that generates a current command based on the speed deviation; and
a current control unit that controls a current supplied to the motor based on the current command.

2. The motor control system according to claim 1, wherein the speed command is a speed feedforward command obtained by time-differentiating the position command.

3. The motor control system according to claim 2, wherein the angular transmission error compensation unit corrects the speed command by correcting the speed feedforward command based on the estimated angular transmission error.

4. The motor control system according to claim 1,
wherein the detection unit detects an event for detecting a rotation angle and a rotation speed of the output shaft of the motor, and
wherein the speed command is a value obtained by adding a speed feedforward command obtained by time-differentiating the position command, and a gain speed command obtained by multiplying a deviation between the position command and the rotation angle of the output shaft of the motor detected based on the event detected by the detection unit by a position proportional gain.

5. The motor control system according to claim 4, wherein the angular transmission error compensation unit corrects the speed command by correcting the speed feedforward command based on the estimated angular transmission error.

6. The motor control system according to claim 5,
wherein the angular transmission error compensation unit further corrects the position command based on the estimated angular transmission error, and
wherein the speed command is a value obtained by adding a speed feedforward command obtained by time-differentiating the position command input from the host device and a gain speed command obtained by multiplying a deviation between the corrected position command and the rotation angle of the output shaft of the motor detected based on the event detected by the detection unit by a position proportional gain.

7. The motor control system according to claim 1, wherein the angular transmission error compensation unit estimates the angular transmission error based on a periodic function that models a periodic variation of the angular transmission error.

8. The motor control system according to claim 1, wherein the speed reducer is a strain wave gearing.

9. A control method for a motor control system that controls a motor by controlling a current supplied to the motor based on a position command input from a host device and controls an operation of a speed reducer including an input shaft connected to an output shaft of the motor and an output shaft connected to a load, the motor control system comprising:
a detection unit that detects an event for detecting a rotation speed of the output shaft of the motor;
a speed deviation generation unit that generates a speed command based on the position command and calculates a speed deviation which is a deviation between the speed command and the rotation speed of the output shaft of the motor detected based on the event detected by the detection unit;
an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error;
a current command generation unit that generates a current command based on the speed deviation; and
a current control unit that controls a current supplied to the motor based on the current command.

10. A robot system comprising:
a robot arm;
a motor which is a drive source of a joint of the robot arm;
a speed reducer including an input shaft connected to an output shaft of the motor and an output shaft connected to the joint of the robot arm;
a command unit that generates a position command; and
a motor control system that controls an operation of the motor by controlling a current supplied to the motor based on the position command generated by the command unit,
wherein the motor control system includes:
a detection unit that detects an event for detecting a rotation speed of the output shaft of the motor;

a speed deviation generation unit that generates a speed command based on the position command and calculates a speed deviation which is a deviation between the speed command and the rotation speed of the output shaft of the motor detected based on the event detected by the detection unit;

an angular transmission error compensation unit that estimates an angular transmission error between a rotation angle of the output shaft of the motor and a rotation angle of the output shaft of the speed reducer, and corrects the speed command, the speed deviation, or the rotation speed of the output shaft of the motor detected based on the event detected by the detection unit, based on the estimated angular transmission error;

a current command generation unit that generates a current command based on the speed deviation; and a current control unit that controls a current supplied to the motor based on the current command.

* * * * *